United States Patent [19]

Moritz et al.

[11] 4,039,021
[45] Aug. 2, 1977

[54] PROTECTIVE COVER FOR GUIDING PATHS OF MACHINE TOOLS

[75] Inventors: Werner Moritz, Siegen; Kurt Loos, Netphen-Dreistiefenbach; Friedrich Haschek, Huttental-Weidenau, all of Germany

[73] Assignee: Kabelschlepp Gesellschaft mit beschrankter Haftung, Siegen, Germany

[21] Appl. No.: 631,132

[22] Filed: Nov. 11, 1975

[30] Foreign Application Priority Data

Nov. 12, 1974 Germany .............................. 2453514

[51] Int. Cl.² ........................................ E05D 15/06
[52] U.S. Cl. ................................ 160/202; 74/612; 74/522; 267/70; 160/222; 160/223; 160/224
[58] Field of Search ............... 74/612, 613, 614, 615, 74/519, 520, 522; 267/70, 71, 153; 160/202, 222, 223, 224

[56] References Cited

U.S. PATENT DOCUMENTS

| 1,140,100 | 5/1915 | Bash | 160/202 |
| 1,357,427 | 11/1920 | Seyerle | 74/615 |
| 1,511,233 | 10/1924 | Nicols | 74/615 |
| 2,724,287 | 11/1955 | Knoth | 74/615 X |
| 3,430,676 | 3/1969 | Aberg | 160/202 |
| 3,565,153 | 2/1971 | Loos et al. | 160/202 |
| 3,603,373 | 9/1971 | Loos et al. | 160/202 |
| 3,815,440 | 6/1974 | Mikulin | 74/612 |

FOREIGN PATENT DOCUMENTS

| 1,091,303 | 4/1955 | France | 160/202 |

*Primary Examiner*—Samuel Scott
*Assistant Examiner*—Randall Heald
*Attorney, Agent, or Firm*—Walter Becker

[57] ABSTRACT

A protective cover system for use in connection with guiding paths of machine tools including a plurality of overlapping cover plates telescopically moved into and out of each other while each cover plate at its front end face rests on the guiding path and at the rear end rests on the next segmental cover plate. Between the individual cover plates there are arranged energy storing means the return force of which is zero in the intermediate position of said energy storing means whereas the return force of said energy storing means is at its maximum in the fully pulled-out or pushed-in position of said cover plates. Each energy storing means includes a cylinder with an inserted elastic body and a piston. Between the cylinders and the piston at least one cam segment is provided. Relative movement between the cylinder and the pertaining cam segment is brought about by fork-shaped rods linked with the arms of said fork-shaped rods to the front end faces of the cover plates.

4 Claims, 10 Drawing Figures

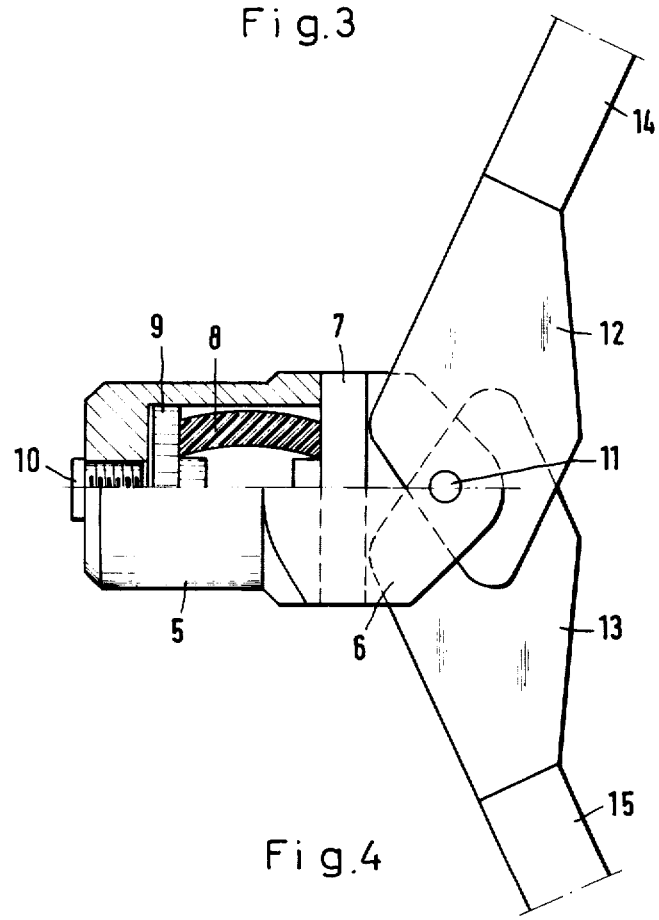
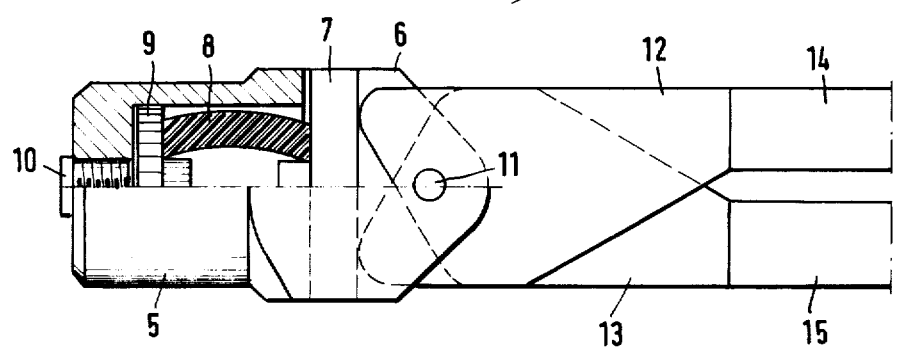

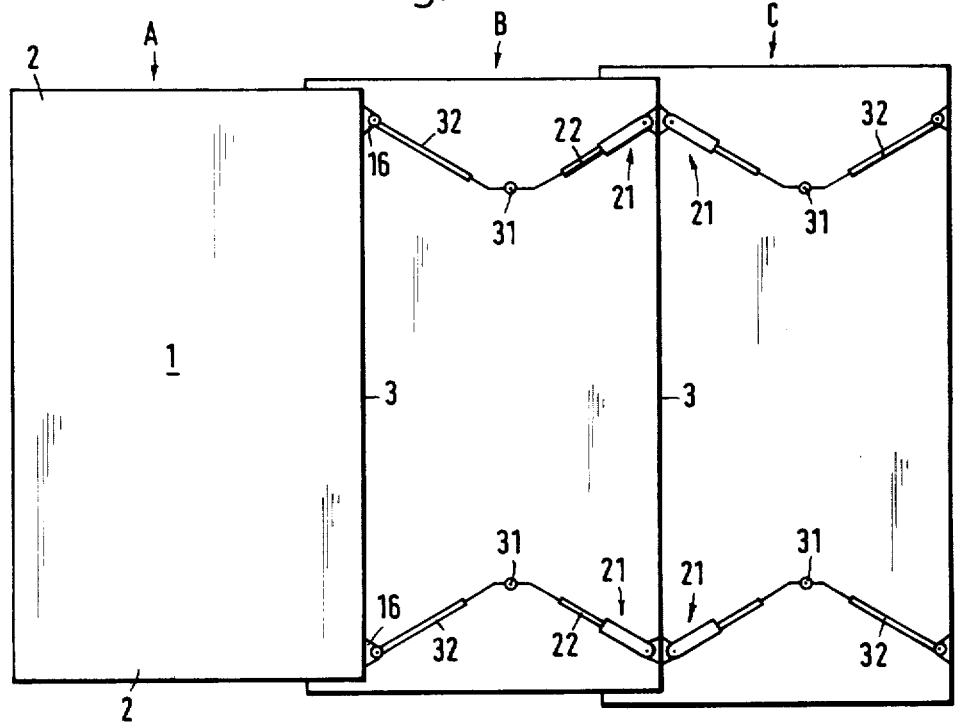
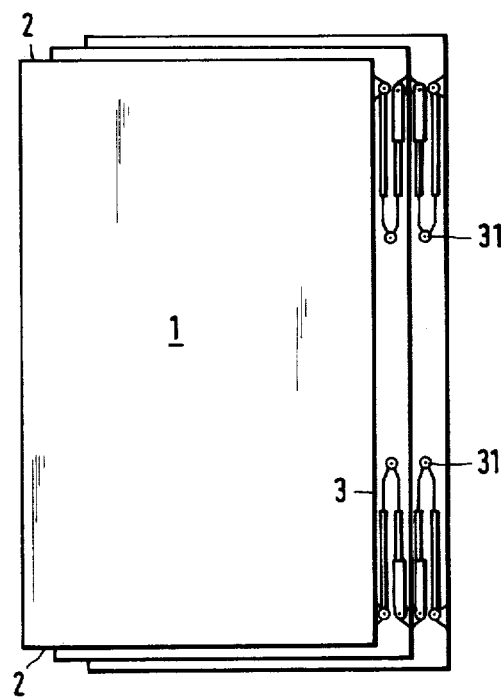

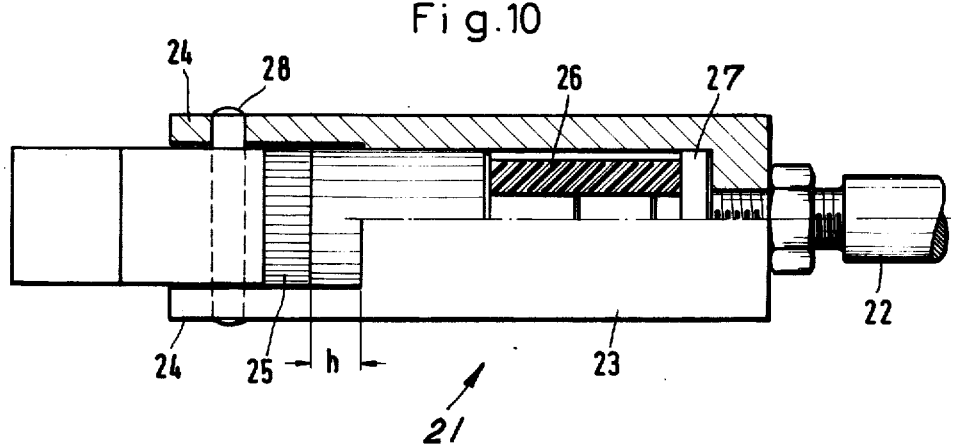
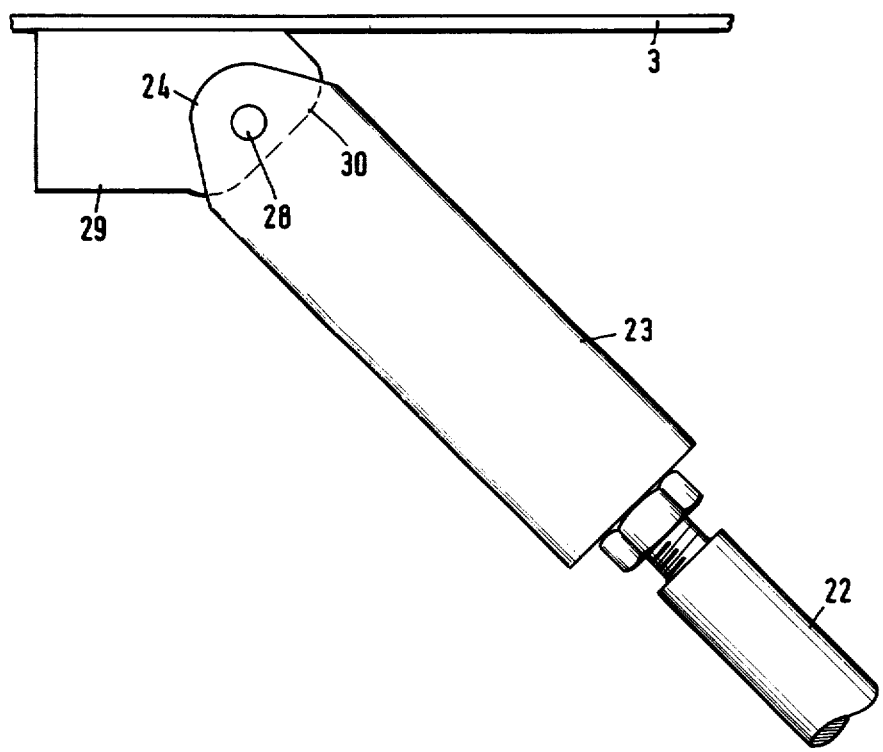

PROTECTIVE COVER FOR GUIDING PATHS OF MACHINE TOOLS

The present invention concerns a protective cover for guiding paths of machine tools comprising a plurality of overlapping cover plates adapted telescopically to move into and out of each other. Each cover plate has its front end face supported on the guiding path and has its rearward end supported by the next smaller cover plate. Between the individual cover plates there are arranged energy storing means. The returning force is zero in the central portion of said energy storing means and reaches its maximum when said cover plates are fully moved into each other and also when said cover plates are fully pulled out of each other.

Protective covers of this type with cover plates telescopically moveable into and out of each other have become known in the form of various embodiments. The energy storing means for generating the returning forces may consist of the following: a guiding tube with inserted pressure springs or a plurality of inserted dish springs. Also the energy storing means may comprise pull rods which are inserted from both sides and which are linked to the cover plates by means of eyes.

According to another embodiment, the energy storing means may also consist of a pneumatic or hydraulic cylinder piston system in which the piston rods are provided with eyes by means of which they are linked to areas below the cover plates.

Furthermore, each energy storage means may consist of a rotatable bar equipped with a torsion spring and linked below a cover plate. Finally, it is also possible to form the energy storing means as tension springs or elastic belts which are connected below one cover plate and are suspended on the end face of the other cover plate in a corresponding eye.

Although protective covers with these heretofore known energy storing means have been able to reach displacement speeds of the magnitude of 100 meters per minute, they still have various drawbacks which prevent a further increase in the displacement speed.

With heretofore known energy storing means, the relative movements between the individual structural elements are so high that premature wear occurs which makes necessary an early replacement of the worn parts. With the energy storage means comprising tension springs of elastic belts, which with each stroke of the cover system are considerably expended, likewise premature fatigue occurs so that they have to be exchanged.

It is, therefore, an object of the present invention to improve the energy storage means to work also at very high displacement speeds and at a high number of strokes over a longer period of operation without being subjected to premature wear or fatigue.

These and other objects and advantages of the invention will appear more clearly from the following specification in connection with the accompanying drawings, in which:

FIG. 3 shows partially in section and partially in top view an energy storing means according to the invention with the protective cover plates in their fully pulled-out position similar to the showing of FIG. 1.

FIG. 4 shows the energy storing means of FIG. 3 in its fully pulled-in position, partially in section and partially in top view.

FIG. 7 represents a top view of a protective cover arrangement according to the invention with energy storing means arranged at the end of forked bars and occupying its fully pulled-out position.

FIG. 8 shows a top view of a protective cover arrangement of FIG. 7 but in its fully closed end position.

FIG. 9 shows an energy storing means of the type used in connection with the arrangement of FIGS. 7 and 8, said energy storing means being shown in top view in its fully relieved central position.

FIG. 10 shows the energy storing means of FIG. 9 partially in section and partially in side view.

The protective cover arrangement according to the present invention is characterized primarily in that each energy storing means comprises a cylinder with an inserted elastic body and a piston. Between the cylinders and the piston there is arranged at least one cam segment. Relative movement between the cylinder and the respective cam segment is effected by fork-shaped rods which have their arms linked to the end walls of the cover plates.

According to a preferred embodiment of the invention, the energy storing means in conformity with the invention may be arranged between the inner ends of two fork-shaped rods connected to the end faces of the cover plates. With this embodiment, the cam segments are expediently connected to the inner end of the fork-shaped rods and are connected to the cylinder of the energy storing means in a hinge-like manner outer ends of the fork-shaped rods are mounted on the end walls of the cover plates by way of supports.

According to another preferred embodiment of the invention, the energy storing means may also be arranged at the outer end of a fork-shaped rod while the pertaining cam segment is on a support.

With both above mentioned embodiments of the invention, the energy storing means are principally of the same design. For purposes of compensating for manufacturing tolerances and for setting the returning forces, a counter piston may be adjustably arranged in each cylinder. The elastic bodies which are compressed in the cylinders between the two pistons preferably consist of a fatigue-free elastic synthetic material or of rubber.

In order to make sure that the cover plates will tilt or cant relative to each other, it has proved expedient always to arrange two pairs of fork-shaped bars or rods with the pertaining energy storing means between the end walls of the cover plates.

Figure 1:
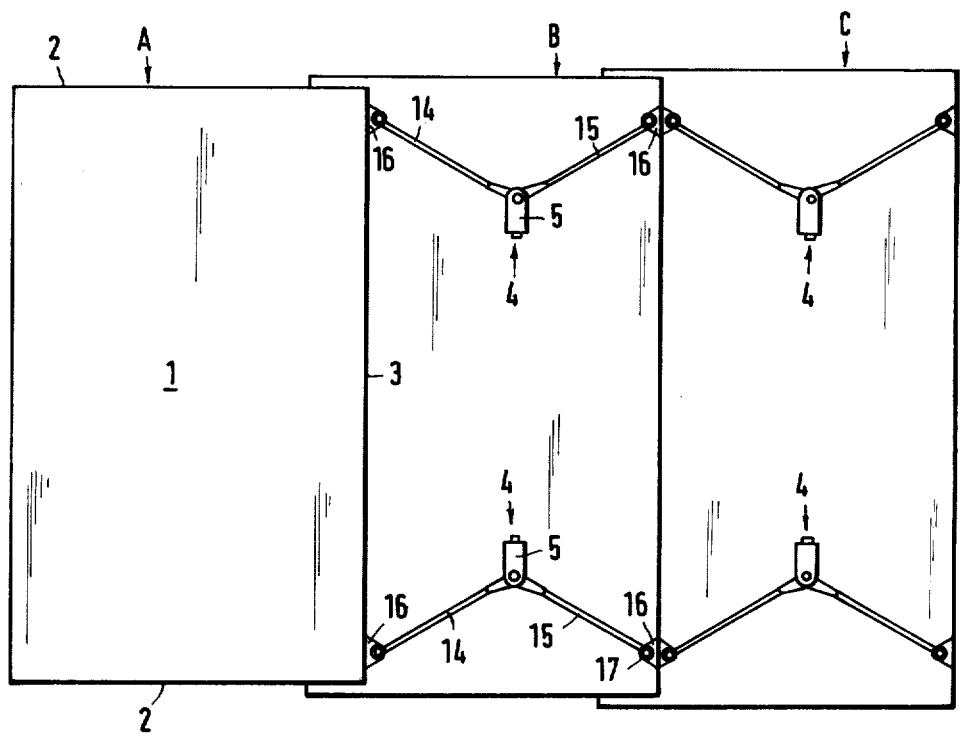
FIG. 1 is a top view of a protective cover arrangement according to the invention which is shown in its pulled-out end position and also illustrates an energy storing means arranged between fork-shaped bars.
Figure 2:
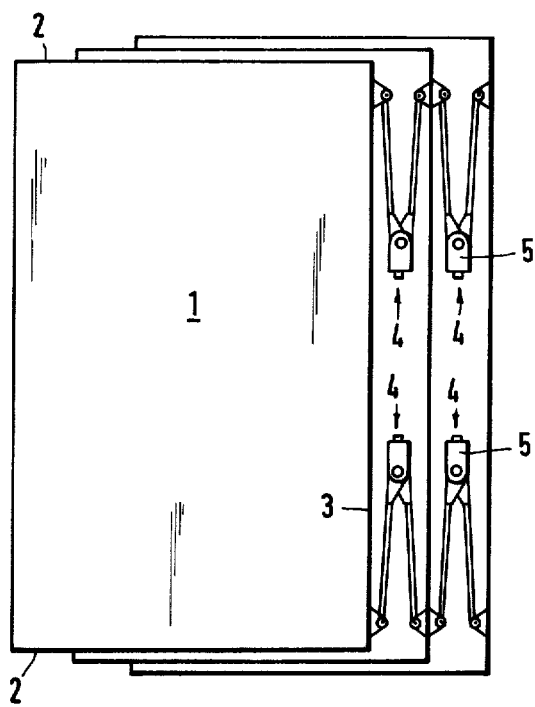
FIG. 2 shows the protective cover arrangement of FIG. 1 but in a completely moved-in end position.

Referring now to the drawings in detail, FIGS. 1 and 2 illustrate a protective cover system according to the invention comprising three cover plates A, B and C. The cover plates A,B,C overlap each other and comprise a cover plate 1, side walls 2 and a front end wall 3. At the lower end of the end wall 3 there are arranged rollers or sliding members by means of which the cover plates A,B,C can rest on a non-illustrated guiding path of a machine tool or the like. Energy storing means 4 are arranged between cover plates A and B and cover plates B and C. In order to show the energy storing means 4, the cover plates 1 of the plates B and C have been omitted in FIGS. 1 and 2.

The structural design of the energy storing means 4 will best be seen from FIGS. 3–6. According to these figures, each energy storing means 4 comprises a cylinder 5 with two lateral extensions 6, a piston 7, elastic body 8, and a counter piston 9 the position of which may be varied by means of a screw 10.

On the extensions 6 on a pin 11, cam segments 12,13 are journalled and the end face thereof engages the outside of the piston 7. The cam segments 12, 13 by way of fork-shaped rods 14, 15 are connected to supports 16 which are connected to the end face walls or end walls 3 of the cover plates A, B, C. The fork-shaped bars 14, 15 are linked to the supports 16 by means of pins 17.

According to the end position shown in FIG. 1 and illustrating the protective cover plates fully moved out, the fork-shaped bars 14, 15 are pressed widely spread apart so that the pistons 7 are by the cam segments 12 to move into the cylinders 5 and compress the elastic body 8 which according to this embodiment consists of a tubular section. When the protective cover arrangement comprising the cover plates A, B, C is moved into the FIG. 2 position, i.e., its fully moved-in end position, the elastic bodies 8 are able to expand in the energy storing means 4 until they have assumed the position illustrated in FIGS. 5 and 6. During a further positioning together of the cover plates A, B, C, the pistons 7 are pressed by the cam segments 12, 13, again to move into cylinders 5 so that the elastic bodies 8 in their fully moved-in end position again reach their compressed position as illustrated in FIG. 4.

Figure 5:
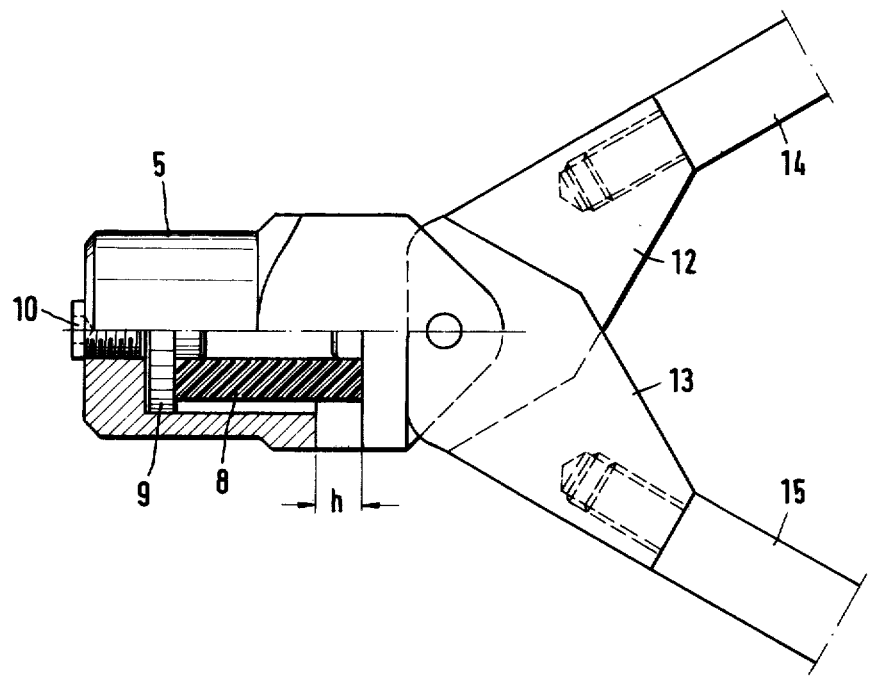
FIG. 5 illustrates the energy storing means of FIGS. 3 and 4 but in its relieved central position, partially sectioned and partially in top view.
Figure 6:
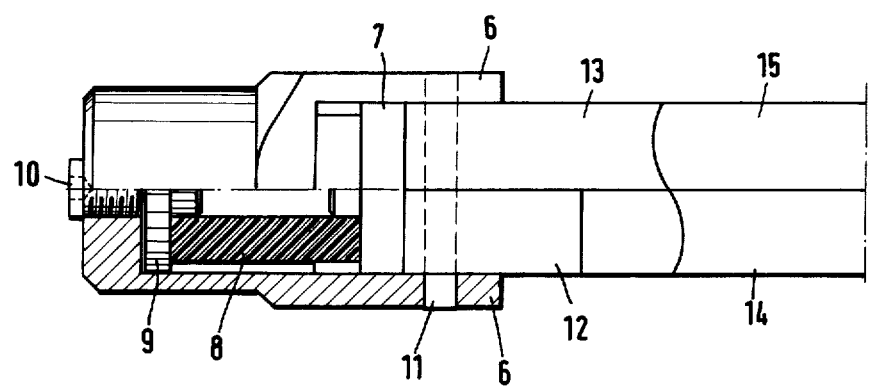
FIG. 6 represents the energy storing means of FIG. 5 partially sectioned and partially in side view.

The relaxed or expanded position of the elastic bodies 8 in the energy storing means 4 as illustrated in FIGS. 5 and 6 corresponds approximately to the position with the protective cover plates pushed together by about half its total length.

Starting from this end position, the protective cover arrangement according to the invention is elastic in both directions like a rubber band and always has the tendency to telescopically move together to half its length or telescopically to expand to twice its length. During such operation, the energy storage means releases acceleration energy which it had absorbed previously as braking energy during the telescopic outward or inward movement of the protective cover. In view of this effect, a protective cover arrangement according to the invention in its frequently used intermediate or central range can be displaced almost free from inertia, whereas when starting from either one of its end positions during the displacement into its central position relieves to a major extent the drive of the carriage to which it is connected because the energy storing means will then be able to release their acceleration energy. In this connection, the elastic bodies 8 in the energy storage means 4 are compressed or expanded by the stroke a.

According to the embodiment illustrated in FIGS. 7–10, the energy storing means 21 are arranged at the outer end of a fork-shaped rod 22. The energy storing means 21 likewise comprises a cylinder 23 with extensions 24, a piston 25, a telescopic body 26, and a counter piston 27 which can be adjusted by the end of the fork-shaped rod 22.

The cylinders 23 are journalled by means of a pin 28 on a support 29 connected to the end wall 3, a cam segment 30 being formed on said support 29. The fork-shaped rods 22 connected to the energy storing means 21 are connected through hinges 31 to the fork-shaped rods 22. The function and operation of the energy storing means 21 correspond to the above described energy storing means 4. As will be evident from FIGS. 7 and 8, the supports 29 for the energy storing means 21 are arranged on the common end face wall 3 of the cover plate B. As a result thereof, the forces which have been conveyed to the rear wall 3 in response to a displacement of the protective cover arrangement will balance each other-- in other words, will nullify each other.

It is, of course, to be understood that the present invention is, by no means, limited to the specific showing in the drawings, but also comprises any modifications within the scope of the appended claims.

What we claim is:

1. A protective cover system which includes: a guiding path for use in connection with machine tools, a plurality of cover plates overlapping each other and telescopically movable into and out of each other, said cover plates successively decreasing in size from one end of said protective cover system to the other end thereof from an intermediate position in one direction into a first end position and in the opposite direction into a second end position, each of said cover plates having a front end face wall section resting on said guiding path and also having a rear end section resting on the respective adjacent next smaller cover plate, and energy storing means arranged between said individual cover plates and operable to exert a return force amounting to substantially zero in said intermediate position and having its greatest magnitude in said first and second end positions, each of said energy storing means comprising a cylinder-piston system and an elastic body interposed between said piston and an end wall in said cylinder and also comprising at least one cam segment between said cylinder and said piston for selectively compressing and relieving said elastic body, and fork-shaped rods for affecting a relative movement of said cylinder-piston system and said cam segment by said fork-shaped rods, said fork-shaped rods having arms defining said fork-shaped portion and being linked to said cover plates, said energy storing means being arranged at the outer end of a fork-shaped rod, two pairs each of fork-shaped rods being arranged between the front end face wall sections of said cover plates, each of said cylinder-piston systems including a counter piston, and means for selectively adjusting said counter piston, the elastic bodies being tubular and made of a fatigue-resistant elastic substance, the pistons of said cylinder-piston systems and said counter pistons being made of a self-lubricating material.

2. A cover system according to claim 1, in which the energy storing means are arranged between the inner ends of two fork-shaped rods, said cam segments being connected to the inner end of the fork-shaped rods and being hinged to the pertaining cylinder.

3. A cover system according to claim 1, which includes bracket means, and in which the outer end of said fork-shaped rods are mounted by said bracket means relative to the front end face wall sections of said cover plates.

4. A cover system according to claim 1, in which the cam segment forms a part of a support.

* * * * *